United States Patent Office 3,686,100
Patented Aug. 22, 1972

3,686,100
ANION-EXCHANGE RESINS AND PROCESS FOR PREPARATION THEREOF
Paolo Parrini, Novara, Lino Credali, Bologna, and Antonio Chiolle, Ferrara, Italy, assignors to Consiglio Nazionale Delle Ricerche, Rome, and Montecatini Edison S.p.A., Milan, Italy
No Drawing. Filed Jan. 27, 1970, Ser. No. 10,111
Claims priority, application Italy, Jan. 30, 1969, 12,185/69
Int. Cl. C08f 3/84, 15/02, 29/12
U.S. Cl. 260—2.1 E
10 Claims

ABSTRACT OF THE DISCLOSURE

Anion-exchange compositions composed of polymers of unsaturated tertiary amines having the formula:

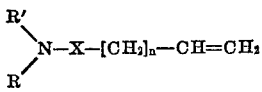

wherein X is a methylene, arylene (having 6 to 10 C atoms) or cycloalkylene (having 3 to 10 C atoms) group; R and R' are the same or different from each other and are alkyl, aryl, cycloalkyl, alkylaryl, or arylalkyl groups containing 3 to 10 C atoms, $n$ is an integer from 1 to 10 when X is a methylene group and is 0 or an integer from 1 to 10 when X is an arylene or cycloalkylene group; the nitrogen atoms of the amine polymer being in the quaternary state. The compositions of the invention include homopolymers of the foregoing amines, copolymers of the foregoing amines with olefins having the formula:

wherein R'' is hydrogen, alkyl, aryl, cycloalkyl, alkylaryl or arylalkyl containing 1 to 10 C atoms and blends of the foregoing amine homopolymers and copolymers with each other and with non-ion exchange polymers composed of alpha-olefins. Methods for the preparation of the foregoing anion-exchange compositions in the form of granules, films and membrane are disclosed.

BACKGROUND OF THE INVENTION

(1) Field of the invention

The present invention relates to new synthetic organic anion-exchange materials, to new anion-exchange membranes comprising such materials and to a process for the preparation thereof.

(2) Description of the prior art

Materials which are perm-selective to either cations or anions have found increasing use in the field of ion-exchange as applied to end uses such as electrodialysis, water demineralization, recovery and concentration of radioactive and light metals, purification of protein and sugar solutions and demineralization applications generally. Such materials may be used in many physical forms, but are most commonly used in particulate form and as membranes. Of particular importance in the foregoing applications are anion-exchange materials, i.e., those materials having high perm-selectivity for anions.

In addition to the anion-exchange characteristics of the material, it must also possess high resistance to both physical and chemical breakdown from the materials with which it comes in contact during use. This property is particularly important with regard to exchange materials in the form of membranes inasmuch as they normally are contacted with strong mineral acids and organic materials of high solvent power.

SUMMARY OF THE INVENTION

We have discovered a new anion-exchange material which possesses both high perm-selectivity to anions and excellent resistance to acids, bases, solvents and the like.

More particularly, we have found that amine polymers comprising homopolymers of unsaturated tertiary amines having the formula:

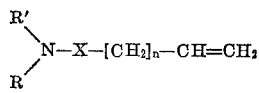

wherein X is a methylene, arylene (having 6 to 10 C atoms) or cycloalkylene group having 3 to 10 C atoms; R and R' are the same or different from each other and are alkyl, aryl, cycloalkyl, alkylaryl or arylalkyl groups containing 3 to 10 C atoms, and $n$ is an integer from 1 to 10 when X is a methylene group and $n$ is either 0 or an integer from 1 to 10 when X is an arylene or cycloalkylene group, and copolymers of the foregoing amines with olefins, wherein at least a portion of the nitrogen atoms of the amine polymer are in the quaternary state, possess superior anion-exchange characteristics. The olefins that may be copolymerized with the above described unsaturated tertiary amines have the general formula:

wherein R'' is hydrogen, alkyl, aryl, cycloalkyl, alkylaryl or arylalkyl containing 1 to 10 C atoms.

Additionally, we have found that blends of amine polymers as defined above with an olefin polymer, which includes homopolymers and copolymers composed of polymerizable monomers of olefins as defined above, which olefin-polymers do not possess anion-exchange properties and are miscible with the amine polymers, possess superior anion-exchange activity, physical strength and resistance to acids, pH variations, organic solvents and the like. Such blends are particularly suitable compositions for the formation of anion-exchange membranes.

The anion-exchange compositions of the present invention may be prepared in the form of granules, films, membranes, tubes or sheets, depending on the specific use contemplated therefor.

The quaternization of the nitrogen in the compositions of the present invention may be carried out either before or after the forming of the composition into the desired shape.

In accordance with a process of the present invention, the anion-exchange composition of the present invention may be prepared by first dissolving the amine homopolymer, the amine-olefin copolymer or either or both of the foregoing and, optionally a non-ion exchange polymer as described hereinabove in an organic solvent therefor. The nitrogen containing component in solution may then be quaternized by methods well known in the art, usually by simply adding a suitable quaternizing agent directly to the solution. After quaternization, the amine polymer may be recovered from the solution in the desired form by evaporating the solvent therefrom. Alternatively, the amine polymer or homogeneous blend thereof with olefin polymer may be recovered from the solution in the desired form without quaternization and the thus obtained formed polymer subjected to quaternization.

While useful in all of the anion-exchange applications described hereinabove, the anion-exchange membranes of the present invention are particularly useful in electrodialysis cells for the demineralization of sea water and brackish water.

DESCRIPTION OF THE PREFERRED EMBODIMENTS

Homopolymers and copolymers, obtained through the homopolymerization of the hereinabove described unsaturated tertiary amines and the copolymerization of the hereinabove described unsaturated tertiary amines with the hereinabove described olefins have been described, for exemple, in U.S. Pat. No. 3,476,726 (Italian Pat. No. 745,-895), the contents of which are incorporated herein by reference. As disclosed in that patent, these homopolymers and copolymers can be obtained by using polymerization catalysts comprising compounds of transition metals of Groups IV, V and VI of the Periodic System and organometal derivatives or metalhydrides of elements of Groups I, II and III of the Periodic System.

Polymers of the following unsaturated tertiary amines are particularly suitable for use in the present invention:

5-N,N-diisopropylamine-1-pentene,
4-N,N-diisopropylamino-1-butene,
11-N,N-diisopropylamino-1-undecene,
11-N,N-dicyclohexylamino-1-undecene,
p-diisopropylamino-styrene,
p-diisopropylaminoallylbenzene,
1-N,N-diisopropylamino-4-allylcyclohexane and
11-N,cyclohexyl,
N-isopropylamino-1-undecene.

Particularly suitable olefins are ethylene, propylene, butene-1, and 4-methyl-pentene.

In accordance with one aspect of the present invention, the anion-exchange compositions of the present invention may be prepared by first dissolving the homopolymer of the tertiary unsaturated amine or the copolymer of such amine and an alphaolefin in an organic solvent. The solvent may be selected from a wide class of compounds, including aliphatic and aromatic hydrocarbons and halogenated derivatives thereof, for example, benzene, toluene, the xylenes, Decalin, Tetralin, tetrachloroethane, and the like, petroleum fractions with a boiling point in the range 50–200° C. or mixtures of these compounds.

The compositions of the present invention may also be prepared by preparing a common solution of the foregoing amine homopolymer or amine-alpha-olefin copolymer and a non-ion-exchange polymer in the hereinabove described solvents. Such polymer should possess essentially no ion-exchange properties, be insoluble in water, and miscible over a wide concentration range with the amine polymer. Generally, polymers of olefins of the same class as the olefins which are used in the amine-olefin-copolymer described above are suitable for use as the non-ion-exchange polymer. The preferred olefin polymers are homopolymers of ethylene, propylene, butene-1, 4-methyl-pentene-1, and copolymers formed by copolymerizing mixtures of these olefins with one another.

The blending of the amine polymer of the present invention with the foregoing non-ion-exchange polymer is of particular advantage when preparing the compositions of the present invention in the form of ion-exchange membranes. Thus, the non-ion-exchange polymers add structural strength and stability to the resulting blend, which characteristics are particularly important for the durability of the membranes. When the amine polymer is a copolymer with an olefin it is not necessary, although it may nevertheless be desirable, to blend such amine polymer with a non-ion-exchange polymer since the copolymer already possesses greatly improved properties of the foregoing type when compared with the amine homopolymer.

The concentration of the amine homopolymer or amine-alpha-olefin copolymer in the solvent, as well as the temperature at which the solution can be prepared may be varied over a wide range depending on the nature of the polymer and the solvent employed.

Particularly advantageous results are obtained by preparing, at temperatures of about 40 to 150° C., solutions containing from about 5 to 40 parts by weight of amine homopolymer or amine-alpha-olefin copolymer per 100 parts by weight of solvent.

When a blend of an olefin polymer with no ion-exchange activity is used with the foregoing described amine homopolymers or copolymers, the ratio by weight of the non-ion-exchange olefin polymer and amine homopolymer or copolymer may vary over a wide range provided that each of the polymers is soluble in the solvent employed at the concentrations of each used. Furthermore, the amine homopolymer or copolymer must be used in such an amount as to produce a sufficient concentration of active ion-exchange groups in the final resin to impart good electrical properties to the membrane itself.

If desired, the solution of the amine homopolymer or copolymer may be subjected directly to quaternization. This is accomplished by adding an appropriate quaternization agent to the solution and subjecting the mixture to quaternizing reaction conditions which are well known in the art. The thus quaternized polymer may then be recovered from the solution by precipitation as granules or in the form of a film, e.g., a membrane, in a manner hereinafter described. After drying, the polymeric composition is ready for use.

If desired, however, the polymer may be first formed into the desired shape and then the shaped article can be subjected to quaternization. Thus, for example, when it is desired to obtain the polymer in the form of a membrane, the solution of the amine copolymer or of the blend of amine homopolymer and/or copolymer with the non-ion-exchange polymer may be placed on a suitable flat surface, for example, a glass plate, prior to quaternization so that upon evaporation of the solvent, a continuous film of uniform thickness is formed. The temperature at which this film is formed is designated the "filming temperature" and depends upon the nature of the solvent and the particular alpha-olefin polymer being used.

The filming temperature must be higher than the temperature at which the precipitation of the polymeric materials from the solution begins and lower than the degradation temperature of the polymer. We have found generally that it is preferable to operate at a temperature between about 40 to 150° C.

The thus formed membrane is separated from the glass plate by washing with a non-solvent material, i.e., a liquid in which the polymer composition comprising the membrane is insoluble.

Preferred non-solvents are lower aliphatic alcohols such as methanol, ethanol, propanol and the like.

The separation and washing treatment is preferably carried out at a temperature of from about —10° C. to 70° C.

The membrane is then dried for a period of time and at a temperature depending on the specific amine and alpha-olefin polymers employed and the nature of the solvent and the non-solvent employed. Preferably, the drying is carried out at a temperature of from about 40 to 180° C. for from about 1 to 2 hours.

The dried membrane is then subjected to quaternization by known methods. Generally, this step is carried out by contacting the membrane with an appropriate quaternizing agent or a solution thereof. The quaternizing agent may be selected from a wide class of compounds which are well known in the art to be suitable for such purpose. These compounds must be sufficiently reactive to react with the tertiary amino groups bonded to the polymer so as to form stable quarternary ammonium groups therewith.

Preferable quaternizing agents which may be used singly or in admixture with each other are alkyl or arylalkyl dihalides such as, for example, 1,2-dichloroethane,
1,2-dibromoethane,
1,2-diiodoethane,
1,3-dichloropropane,
1,3-dibromopropane,
1,3-diiodopropane,
1,4-dichlorobutane,
1,4-dibromobutane,
1,4-diiodobutane,
bis(chloromethyl)1,4-benzene, and
bis(bromomethyl)1,4-benzene;

and alkyl and arylalkyl monohalides and sulfates, such as, for example, methyl, ethyl propyl and benzyl chloride, iodide, bromide and sulfate.

When using the foregoing dihalide quaternizing agents, a cross-linking reaction occurs simultaneously with the quaternization in the polymeric material.

In addition, a quaternization without simultaneous cross-linking, occurs when the foregoing described monofunctional quaternizing agents are used.

Preferably, the quaternization is performed by dipping the membrane in a solution of the quaternizing agent, which agent is present in amounts sufficient to produce the desired degree of conversion of the tertiary amine groups into quaternary ammonium groups, which degree is generally close to 100%.

The quaternization of the amine homopolymer or copolymer or blend thereof with non-ion-exchange olefin polymer which constitutes the membrane is preferably carried out at a temperature varying from about 10 to 100° C. for a period from about 1 to 48 hours. In one preferred embodiment, particularly when employing dihalide quaternizing agents, the initial temperature is ambient and is later raised to about 80° C.

Preferable solvents for carrying out the quaternization are lower aliphatic alcohols capable of swelling the polymeric materials which constitute the membrane, thus promoting penetration of the quaternizing agent into the membrane. The membrane is then repeatedly washed with the same solvent used for the quaternization and is then washed with water.

Membranes prepared in accordance with the foregoing procedure are in no way damaged or made brittle during the quaternization or cross-linking reactions, or in the subsequent washing of the membrane.

The anion-exchange membranes obtained in accordance with the present invention are generally tough, flexible and insoluble in water and can be prepared with or without the addition of plasticizers, such as, for example, diethylphthalate, diethyl-succinate and the like. The membranes may be prepared in thicknesses varying over a wide range and are thus suitable for use in multichamber electrodialysis cells and also in standard ion-exchange columns.

Membranes prepared in accordance with the foregoing process are characterized by a strong resistance to the adsorption of organic substances which, if adsorbed, quickly damage the anion-exchange membranes. The membranes of the present invention are also highly resistant to chemical reactants and particularly to pH variations which may occur during electrodialysis processes.

The mechanical properties of the membranes prepared in accordance with the present invention can be further improved by incorporating therein suitable supports. For this purpose, natural fibers, as well as artificial or synthetic fibers of organic and inorganic polymers or fabrics prepared therefrom, may be employed. Particularly advantageous results can be obtained by using glass fabrics and fabrics made from polyethylene-terephthalate, polypropylene, polyamides and the like.

The anion-exchange materials of the present invention are characterized by a high exchange-capacity, by a low electrical resistance and a low water-absorption. The exchange-capacity can be varied over a wide range by regulating the concentration of the fixed ionic charges. These materials, quaternized in the chloride form, have a high electrical conductivity, generally greater than $1 \times 10^{-4}$ ohm$^{-1}$ cm.$^{-1}$.

The perm-selectivity of the membranes of the present invention to anions is demonstrated by the high potential observed when such membrane is used in a standard cell of the type:

Calomel electrode
Saturated KCl saline bridge
KCl 0.2 molal solution
Membrane of the present invention
KCl 0.1 molal solution
Saturated saline bridge
Calomel electrode At 25° C., the measured concentration potential is near the ideal thermodynamic value of 16.08 millivolts for the foregoing cell.

The following examples serve to further illustrate the present invention.

EXAMPLE 1

8 g. (0.0472 mole) of poly(5-N,N-diisopropylamino-1-pentene) with an inherent viscosity, in Tetralix (0.25% by weight) at 135° C., of 1.4, were dissolved in 100 cc. of anhydrous benzene. 0.0236 mole of diiodoethane dissolved in 20 cc. of anhydrous benzene were then added to the polyamine solution. The resulting solution was then allowed to stand in the dark for 2 hours and then heated to 85° C. over 3 hours and then allowed to stand for 15 hours.

A precipitate was obtained thereby in the form of homogeneous granules. This precipitate was separated, washed with anhydrous benzene and finally dried in an oven at 80° C. The resin thus obtained was insoluble in acids, bases and saline solutions.

The ion-exchange capacity of this resin (determined according to what is described in "Test Manual for Permoselective Membranes," method 502-1, p. 132) in the iodide form, measured by exchanging the I$^-$ ion with NO$_3^-$ ion, was equal to 3.1 meq./gram of dry product.

EXAMPLE 2

A few grams of the resin obtained in Example 1 were slurried several times with 1 N HCl, until the iodide ion was no longer detectable. The resin was washed with deionized H$_2$O until the chloride ion was no longer detectable. An exchange capacity of about 4.3 meq./gram of dry product was determined on the resin in the chloride form. From this example it is clear that the anion-exchange capacity of the resin in the iodide form can be easily transformed in the chloride form; which is usually employed.

EXAMPLE 3

A solution of poly (5 - N,N - diisopropylamino-1-pentene) of the same type of Example 1, was prepared by dissolving 8 g. of polymer in 80 cc. of anhydrous toluene at a temperature of about 80 C., while maintaining the temperature at 80° C.

8 g. of polybutene-1 with an inherent viscosity in tetralin (0.1% by weight) at 135° C. of 1.7, were then added to this solution, and the resulting solution was stirred for about 2 hours and then filtered under pressure and deaerated.

The solution was spread on a glass plate to form a 40 x 30 cm. film. The glass plate on which the solution had been spread was then placed in an oven at 60° C. for one hour, and thereafter in an oven at 80° C. for about half an hour. The film was removed from the glass plate by dipping the plate in anhydrous ethanol.

A 0.02 cm. thick homogeneous film having a tensile strength of 140 kg./cm.$^2$ was obtained. The thus prepared film was dried at 100° C. to constant weight.

The dried film was quaternized by immersing it in a solution made up of 6.67 g. of $C_2H_4I_2$ (diiodoethane) in 400 cc. of anhydrous ethanol for 48 hours at room temperature. The temperature was then raised to 80° C. and maintained at 80° C. for about 2 hours.

The thus treated membrane was washed first at room temperature and then at about 80° C. with anhydrous ethanol to completely remove the unreacted diiodoethane. The membrane was finally washed with cold water.

A homogeneous 0.02 cm. thick membrane was obtained. The electrical and mechanical properties of the membrane are set forth in Table I.

TABLE I

| Properties | Procedure | Values |
|---|---|---|
| Electrical resistance | (1) | 1.5 ohm cm.$^2$ |
| Transport number $t_{Cl}-$ | (2) | 0.95. |
| Exchange-capacity | (3) | 2 meg./gram. |
| Tensile strength under traction | (4) | 140 kg./cm.$^2$ |
| Resistance to burst | (5) | 1.2 kg./cm.$^2$ |
| Water absorption | (6) | 30% by weight. |

[1] In an 0.5 N NaCl solution at 25±0.1° C., according to the procedure described in "Test Manual for Permoselective Membranes." Method 601-1, page 156, Report No. 77, O.S.W.
[2] In 0.5/0.25 N NaCl; procedure described in "Test Manual for Permoselective Membranes." Method 602-1, page 163.
[3] Procedure described in "Test Manual for Permaselective Membranes." Method 502-1, page 132.
[4] According to ASTM DS82-56 T.
[5] According to ASTM D774-46.
[6] Procedure described in "The Manual for Permoselective Membranes." Method 412-1, page 120, O.S.W. 77.

NOTE.—O.S.W. indicates "Office of Saline Water," U.S. Department of the Interior.

EXAMPLE 4

A film was prepared according to the procedure described in Example 3 using a solution of 6 g. of polybutene-1 and 4 g. of poly(5-N,N-diisopropylamino-1-pentene) in 50 cc. of anhydrous toluene.

The film was then treated with 3.34 g. of diiodoethane in 200 cc. of anhydrous ethanol, in accordance with the procedure of Example 3.

A membrane of 0:02 cm. thickness having the properties set forth in Table II was obtained.

TABLE II

| Properties | Procedure* | Values |
|---|---|---|
| Electrical resistance | (1) | 6.5 ohm cm.$^2$ |
| Transport number $t_{Cl}-$ | (2) | 0.98. |
| Exchange-capacity | (3) | 1.5 meq./gram. |
| Tensile strength under traction | (4) | 145 kg./cm.$^2$ |
| Resistance to burst | (5) | 1.4 kg./cm.$^2$ |
| Water absorption | (6) | 24% by weight. |

*See corresponding footnotes to Table I.

EXAMPLE 5

A solution of 10 g. of poly(5-N,N-diisopropylamino-1-pentene) and 10 g. of polybutene-1 in 100 g. of anhydrous toluene was prepared according to the procedure described in Example 3.

A polyethylene terephthalate fabric (mesh=1 mm.) was then dipped in this solution. The fabric was then slowly removed from the solution and the solvent was evaporated.

This procedure was repeated until a supported membrane containing about 2 g. of polymeric material per gram of dry fabric was obtained. The membrane was then treated with diiodoethane according to the procedure described in Example 3. The thus obtained membrane possessed the following properties:

| Properties | Procedure* | Values |
|---|---|---|
| Electrical resistance | (1) | 5 ohm cm.$^2$ |
| Transport number | (2) | 0.84. |
| Exchange-capacity | (3) | 2. meq./gram. |

*See corresponding footnotes at Table I.

EXAMPLE 6

A solution of 20 g. of a copolymer of 5-N,N-diisopropylamino-1-pentene with butene-1, with an inherent viscosity in tetralin (0.25% by weight) at 135° C. of 1.3 and having a combined nitrogen content of 3.1% by weight (that is, a molar ratio amine/butene-1 equal to 1:5), in 100 g. of anhydrous tetrachloroethane was prepared, and this solution was used to prepare a membrane (40 x 30 cm.) having a thickness of 0.2 mm. by following the procedure descrbied in Example 3. The properties of this membrane are summarized in Table III.

TABLE III

| Properties | Procedure* | Values |
|---|---|---|
| Electrical resistance | (1) | 1.4 ohm cm.$^2$ |
| Transport number $t_{Cl}-$ | (2) | 0.97. |
| Exchange-capacity | (3) | 1.9 meq./gram. |
| Tensile strength under traction | (4) | 1.55 kg./cm.$^2$ |
| Resistance to burst | (5) | 1.6 kg./cm.$^2$ |
| Water absorption | (6) | 28%. |

*See corresponding footnotes to Table I.

EXAMPLE 7

A solution of poly(5-N,N-diipropylamino-1-pentene) of the same type as that of Example 1 was prepared by dissolving 8 g. of polymer in 80 cc. of decahydronaphthalene at a temperature of 140° C. While maintaining the temperature at 140° C., 8 g. of polypropylene (Moplen T 30 G, manufactured by Montecatini Edison S.p.A., Italy) were added to this solution, and the resulting solution was stirred for about 2 hours and then filtered under pressure and deaerated.

The solution was spread on a glass plate to form a 40 x 30 cm. film. The glass plate on which the solution had been spread was then placed in an oven at 140° C. for 10 minutes. The film was removed from the glass plate by dipping the plate in anhydrous ethanol.

A 0.02 cm. thick homogeneous film having a tensile strength of 210 kg./cm.$^2$ was obtained.

The dried film was then quaternized according to the procedure of Example 3.

A homogeneous 0.02 cm. thick membrane was obtained. The electrical and mechanical properties of the membrane are set forth in Table IV.

TABLE IV

| Properties | Procedure* | Values |
|---|---|---|
| Electrical resistance | (1) | 6.8 ohm cm.$^2$ |
| Transport number $t_{Cl}-$ | (2) | 0.98. |
| Exchange-capacity | (3) | 2 meq./gram. |
| Tensile strength under traction | (4) | 210 kg./cm.$^2$ |
| Resistance to burst | (5) | 1.8 kg./cm.$^2$ |
| Water absorption | (6) | 25% by weight. |

*See corresponding footnotes to Table I.

EXAMPLE 8

8 g. of poly(5-N,N-diisobutylamino-1-pentene) with an inherent viscosity in Tetralin (0.25% by weight) at 135° C. of 1,2 were dissolved in 80 cc. of tetrachloroethane at 120° C. While maintaining the temperature at 120° C., 8 g. of polybutene-1, of the same type as that of Example 3, were then added to this solution, and the resulting solution was stirred for about 2 hours and then filtered under pressure and deaerated.

The solution was spread on a glass plate to form a 40 x 30 cm. film. The glass plate on which the solution had been spread was then placed in an oven at 120° C. for 20 minutes. The film was removed from the glass plate by dipping the plate in anhydrous ethanol.

A 0.02 cm. thick homogeneous film having a tensile strength of 135 kg./cm.$^2$ was obtained.

The film was then quaternized by immersing it in a solution made up of 5.7 g. of $C_2H_4I_2$ (diiodoethane) in 400 cc. of anhydrous ethanol for 48 hours at room temperature. The temperature was then raised to 80° C. and maintained at 80° C. for about 2 hours.

The thus treated membrane was washed first at room temperature and then at about 80° C. with anhydrous ethanol to completely remove the unreacted diiodoethane. The membrane was finally washed with cold water.

A homogeneous 0.02 cm. thick membrane was obtained. The electrical and mechanical properties of the membrane are set forth in Table V.

TABLE V

| Properties | Procedure* | Values |
|---|---|---|
| Electrical resistance | (1) | 2.5 ohm cm.$^2$ |
| Transport number $t_{Cl}-$ | (2) | 0.93. |
| Exchange-capacity | (3) | 1.6 meq./gram. |
| Tensile strength under traction | (4) | 135 kg./cm.$^2$ |
| Resistance to burst | (5) | 1.2 kg./cm.$^2$ |
| Water absorption | (6) | 26% by weight. |

*See footnotes to Table I.

EXAMPLE 9

8 g. of poly(11-N,N-diisopropylamino-1-undecene) with an inherent viscosity in Tetralin (0.25% by weight) of 1.3, were dissolved in 80 cc. of anhydrous toluene at 80° C. While maintaining the temperature at 80° C., 8 g. of polybutene-1 were added to this solution, and the resulting solution was stirred for about 2 hours and then filtered under pressure and deaerated.

The solution was spread on a glass plate to form a 40 x 30 cm. film. The glass plate on which the solution had been spread was then placed in an oven at 80° C. for about half an hour. The film was removed from the glass plate by dipping the plate in anhydrous ethanol.

A 0.02 cm. thick homogeneous film having a tensile strength of 110 kg./cm.$^2$ was obtained. The thus prepared film was dried at 100° C. to constant weight.

The dried film was quaternized by immersing it in a solution made up of 4.45 g. of $C_2H_4I_2$ (diiodoethane) in 400 cc. of anhydrous ethanol for 48 hours at room temperature. The temperature was then raised to 80° C. and maintained at 80° C. for about 2 hours.

The thus treated membrane was washed first at room temperature and then at about 80° C. with anhydrous ethanol to completely remove the unreacted diiodoethane. The membrane was finally washed with cold water.

A homogeneous 0.02 cm. thick membrane was obtained. The electrical and mechanical properties of the membrane are set forth in Table VI.

TABLE VI

| Properties | Procedure* | Values |
|---|---|---|
| Electrical resistance | (1) | 5.5 ohm cm.$^2$ |
| Transport number $t_{Cl}-$ | (2) | 0.91. |
| Exchange-capacity | (3) | 1.4 meq./gram. |
| Tensile strength under traction | (4) | 110 kg./cm.$^2$ |
| Resistance to burst | (5) | 1 kg./cm.$^2$ |
| Water absorption | (6) | 21% by weight. |

*See footnotes to Table I.

Variations and modifications can, of course, be practiced without departing from the scope and spirit of the present invention.

Having thus described the present invention, what it is desired to secure and claim by Letters Patent is:

I claim:

1. An anion-exchange composition consisting essentially of:

(A) an amine polymer selected from the group consisting of:
(a) a homopolymer of an unsaturated tertiary amine having the formula:

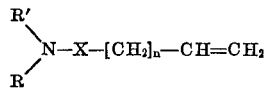

wherein X is a methylene group or a cycloalkylene group having 3 to 10 carbon atoms; R and R' are the same or different from each other and are selected from the group consisting of alkyl and cycloalkyl groups containing 3 to 10 carbon atoms, $n$ is an integer from 1 to 10 when X is methylene and is zero or an integer from 1 to 10 when X is cycloalkylene; and
(b) a copolymer of said unsaturated tertiary amine and an olefin having the formula:

$$R''-CH=CH_2$$

wherein R'' is hydrogen, or an alkyl or cycloalkyl group containing 1 to 10 carbon atoms; or (B) a blend of said amine polymer with an olefin polymer selected from the group consisting of:
(c) a homopolymer of an olefin having the formula:

$$R''-CH=CH_2$$

wherein R'' is hydrogen, alkyl, aryl, cycloalkyl, alkylaryl or arylalkyl containing 1 to 10 carbon atoms; and
(d) a copolymer of at least 2 of said olefins; said amine polymer of said composition having been at least partially quaternized and simultaneously crosslinked by means of an alkyl or arylalkyl dihalide quaternizing agent.

2. The anion-exchange composition of claim 1 which consists essentially of, a blend of said amine polymer with an olefin polymer selected from the group consisting of
(a) a homopolymer of an olefin having the formula:

$$R'-CH=CH_2$$

wherein R'' is hydrogen, alkyl, aryl, cycloalkyl, alkylaryl or arylalkyl containing 1 to 10 C. atoms; and
(b) a copolymer of at least 2 of said olefins.

3. The anion-exchange composition of claim 1 wherein said unsaturated tertiary amine is selected from the group consisting of 5-N,N-diisopropylamino-1-pentene,
4-N,N-diisopropylamino-1-butene,
11-N,N-diisopropylamino-1-undecene,
11-N,N-dicyclohexylamino-1-undecene,
p-diisopropylamino-styrene,
p-diisopropylamino-allylbenzene,
1-N,N-diisopropylamino-4-allylcyclohexane,
11-N-cyclohexyl, and
N-isopropylamino-1-undecene.

4. The anion-exchange composition of claim 1 wherein said olefin is selected from the group consisting of ethylene, propylene, butene-1, and 4-methyl-pentene-1.

5. The anion-exchange composition of claim 2 wherein said olefin of said olefin polymer is selected from the group consisting of ethylene, propylene, butene-1 and 4-methyl-pentene-1.

6. The anion-exchange composition of claim 2 wherein the ratio of said amine polymer to said olefin polymer is about 0.4:1 to 2:1 by weight.

7. The composition of claim 1 in granule, tube or membrane form.

8. The anion-exchange composition of claim 6 wherein the ratio of said amine polymer to said olefin polymer is about 0.66:1 to 1:1 by weight.

9. The composition of claim 1, wherein said quaternizing agent is a lower alkyl dihalide or a xylyl dihalide.

10. The composition of claim 9 wherein said quaternizing agent is selected from the group consisting of 1,2-dichloroethane, 1,2-dibromoethane, 1,2-diiodoethane, 1,3-dichloropropane, 1,3-dibromopropane, 1,3-diiodopropane, 1,4-dichlorobutane, 1,4-dibromobutane, 1,4-diiodobutane, bis(chloromethyl)-1,4-benzene, and bis(bromomethyl)-1,4-benzene.

References Cited

UNITED STATES PATENTS

| | | | |
|---|---|---|---|
| 3,433,755 | 3/1969 | Cooket et al. | 260—2.2 |
| 3,563,921 | 2/1971 | Bourat | 260—2.1 |
| 2,663,702 | 12/1953 | Kropa | 260—88.1 |
| 2,681,319 | 6/1954 | Bodamer | 260—2.1 |
| 3,293,326 | 12/1966 | Jezl et al. | 260—878 |
| 3,476,726 | 11/1969 | Giannini et al. | 260—89.7 |
| 3,529,038 | 9/1970 | Chabert et al. | 260—897 |

OTHER REFERENCES

Ackermann et al.: Z. Physik, Chem., 49, 331–34 (1966).

MELVIN GOLDSTEIN, Primary Examiner

U.S. Cl. X.R.

117—161 UZ; 204—296; 260—88.1 PN, 896, 897 B